United States Patent [19]

Lee

[11] Patent Number: 4,899,381
[45] Date of Patent: Feb. 6, 1990

[54] SINGLE-LINE TELEPHONE HOLD CIRCUIT

[75] Inventor: Gerritt S. K. Lee, Honolulu, Hi.

[73] Assignee: GTE Hawaiian Telephone Company Incorporated, Honolulu, Hi.

[21] Appl. No.: 334,623

[22] Filed: Apr. 7, 1989

[51] Int. Cl.$^4$ .............................................. H04M 9/02
[52] U.S. Cl. .................................. 379/393; 379/387; 379/162; 379/163
[58] Field of Search ................. 379/393, 387, 162, 163

[56] References Cited

U.S. PATENT DOCUMENTS

| Re. 29,078 | 12/1976 | Tate | 379/162 |
|---|---|---|---|
| 3,629,514 | 12/1971 | Flamini | 379/393 |
| 3,952,169 | 4/1976 | Vincent | 379/163 |
| 4,079,212 | 3/1978 | Sasai | 379/162 |
| 4,394,544 | 7/1983 | De Leon | 379/162 |
| 4,435,622 | 3/1984 | Grantland et al. | 379/393 |
| 4,447,674 | 5/1984 | Grantland | 379/190 |
| 4,454,385 | 6/1984 | Grantland | 379/190 |
| 4,529,843 | 7/1985 | Boeckmann | 379/393 |

OTHER PUBLICATIONS

DEoFONE, "Two-Line Controller with Ringing," Cat. No. 43-380, Radio Shack, A division of Tandy Corporation.

Primary Examiner—Jin F. Ng
Assistant Examiner—Jhancy Augustus
Attorney, Agent, or Firm—Douglas M. Gilbert

[57] ABSTRACT

A pair of interface devices, mounted externally to a pair of residential telephones, can place a temporary hold on the associated telephone line circuit. Each interface device interconnects a standard residential telephone with an associated telephone line circuit. In a two telephone arrangement to place the telephone circuit in a hold condition, the user throws a switch mounted on the interface device, and hangs up the handset (goes on hook). The switch places two indicator lamps across the two-wire line circuit to simulate an off-hook condition. To remove the hold condition, the user merely throws the same switch or the switch associated with one of the other phones in the residence. There is no need to return to the original phone first used to establish the hold.

12 Claims, 3 Drawing Sheets

SINGLE-LINE TELEPHONE HOLD CIRCUIT

BACKGROUND OF THE INVENTION

1. Field of the Invention

The present invention relates to telecommunications and more particularly to an auxiliary interface device for use in a residential telephone subscriber line circuit to place a temporary hold on a subscriber's telephone line.

2. Description of the Prior Art

At the present time it is common for many residential telephone subscribers to have one or more extension telephones connected to what is called a single-part telephone line. During a typical call it is common for a subscriber/user to either interrupt the conversation for a short time period or to change from one phone to another at a different location. When changing phones with a call in progress, the first telephone has to be left off-hook while the user transfers to a second location where the second phonse is located, otherwise the phone company equipment will sense an on-hook condition and will accordingly disconnect the two parties. The first phone then remains off-hook during the remaining part of the conversation unless the user wishes to return to the first location to replace the phone on the hook switch. Although this is an obvious bother, if it is not done the user often forgets at the end of the conversation that the first phone was left off-hook making it impossible for an incoming call to get through to the subscriber even though the line is not otherwise being used. Neither situation is highly desirable either for the subscriber or the telephone company providing the service.

Many of the recent model phones are equipped with a "HOLD" button or key which, when operated, permits the subscriber to hang up the handset of the telephone instrument without causing the central office equipment to disconnect the call. The basic purpose of a hold circuit is to switch an artificial load across the line so that when the hook switch goes open, the artificial load will dissipate enough line current to keep the line seized in the central office. Functionally a hold button allows a user to momentarily interrupt a call and replace the handset on the hook switch without terminating the call. Then the user can return to the same phone to remove the hold and complete the conversation. If the user completes the call on a different phone without releasing the hold on the first phone, it is often necessary, depending on the phone model, to return to the first phone to remove the hold to unseize the line. Obviously the inclusion of a hold-key function in the telephone instrument is not a complete solution to the particular problem posed. Nor is the inclusion of a hold key with a timed release a complete solution to the particular problem, since the user only has a short interval in which to pick up a second phone on the same line before the line disconnects. Too long of a delay keeps the line seized (loaded) during the remaining period of the call and potentially seized even after the user has finished the call.

Some current model telephones have "hold" buttons that will allow the hold to be released by picking up an extension phone instrument. However, a hold can only be activated in one direction (by the phone with the hold key) unless of course both phones are equipped with a hold function key.

This invention is directed to a very simple and inexpensive device which overcomes the above problems.

A general object of the invention is the provision of a telephone hold circuit which can be added to existing telephones without extensive rewiring changes or mechanical modification of the phone instruments, and which will allow a hold condition to be placed or removed from whichever phone is used.

Another object of this invention is the provision of an interface device to interface between a telephone subscriber's line and two or more telephone instruments to permit the subscriber to place or remove a hold condition from whichever phone is used, i.e., a two-way hold function.

SUMMARY OF THE INVENTION

In accordance with the teachings of the present invention, these and other objects are achieved through provision of a circuit arrangement that functions as an interface device between a telephone subscriber's line and two or more telephone instruments. The circuit arrangement as disclosed will permit a hold condition to be placed on a telephone line from any one of the subscriber telephone instruments by merely throwing a toggle or push-button switch mounted on the interface/attachment device. The device connects between the phone instrument and the wall jack connecting the phone instrument to the phone line. The hold is removed and conversation may continue on the same or any other telephone by throwing the switch associated with that telephone instrument which the subscriber chooses to utilize. There is no need to return to the original phone first used for any purpose.

BRIEF DESCRIPTION OF THE DRAWINGS

For a better understanding of the invention as well as other objects and further features thereof, reference is made to the following description which is to be read in conjunction with the accompanying drawings wherein.

DETAILED DESCRIPTION OF THE INVENTION

Figure 1:
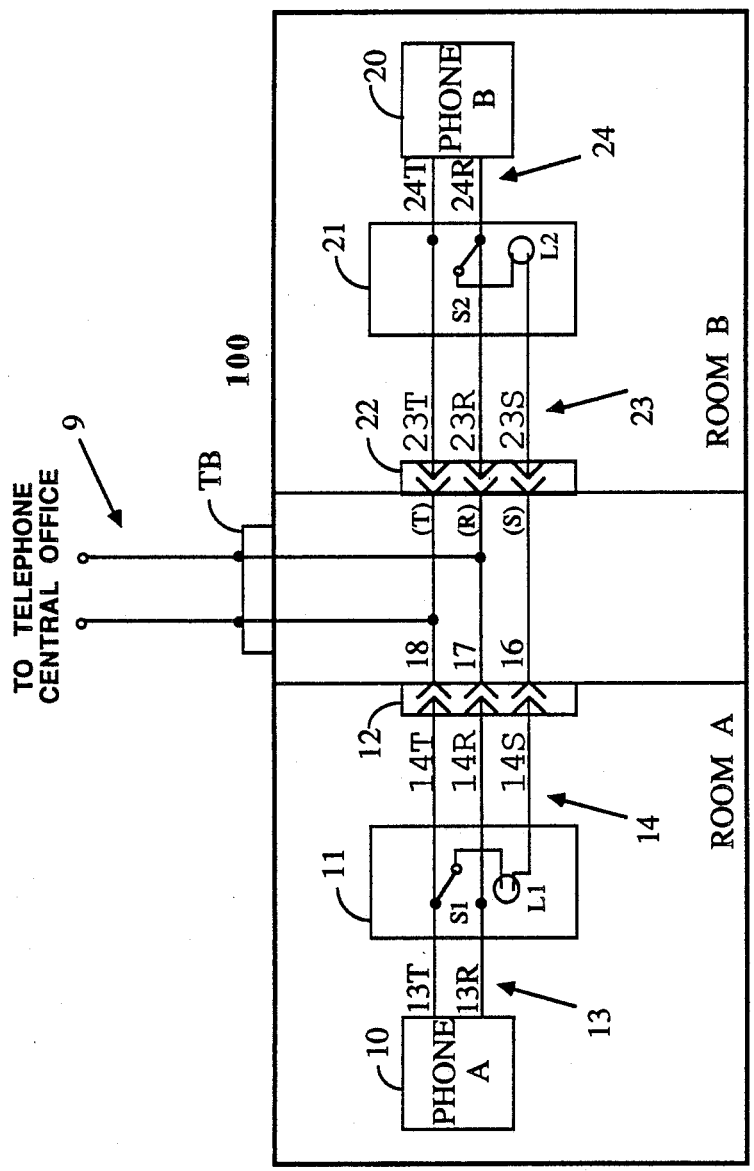
FIG. 1 is a block schematic diagram of a telephone subscriber's holding circuit for a two-phone arrangement in accordance with the present invention.

For a better understanding of the subject invention, reference is made to the following description and appended claims in conjunction with the above-described drawings. Referring now to FIG. 1, depicted therein is a telephone line circuit comprising a cable pair 9T and 9R. The line, commonly referred to as the local loop, connects via terminal block TB to a pair of subscriber telephone instruments 10 and 20 located inside the residence structure 100. FIG. 1 depicts a residential application for the particular subscriber not for any operational reasons, but only to illustrate the situation in which the subject invention has particular utility. The other end of the local loop connects the subscriber's telephones to the local telephone central office (not shown). Normally both subscriber phones A and B plug directly into wall jacks 12 and 22 that interconnect via the inside wiring 16, 17, and 18. Wall jacks 12 and 22 are typically modular jacks which mate with a corresponding plug that is standard on most commercial telephone instruments today. However, the subject invention can function independent of the particular type of wall jack or line plug.

Figure 2:
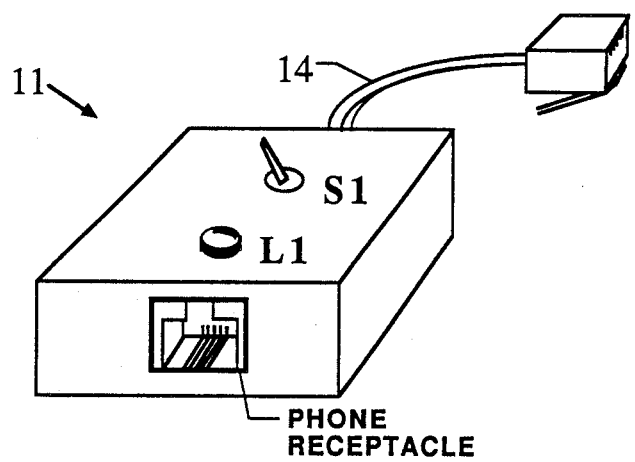
FIG. 2 is a perspective view illustrating one form of the telephone hold circuit device of the present invention.

Also shown in FIG. 1 are a pair of interface devices 11 and 21 which illustrate an embodiment of this invention. These devices electrically interconnect the associated phone A or B with wall jack 12 or 22, respectively. Interface device 11 comprises a separate housing as depicted in FIG. 2 for mounting of the two electrical components. The interface device includes an inexpensive single-pole double-throw (SPDT) switch S1 and a low-voltage incandescent lamp L1. Cable 14 interconnects interface device 11 with the wall receptacle 12, and the modular phone receptacle (on interface device 11) accepts the plug mounted on the line cord from phone A. Interface device 21 contains the same type of SPDT switch S2 and the same type of low-voltage incandescent lamp L2 as is in interface device 11. The two switches S1 and S2 are wired to connect the center terminal (wiper) to either the tip (T) or ring (R) leads. The center terminal of 11 and 21 connects to one side of the lamp circuit, and the other side of the lamp is wired to jack 12 (22) via line 14S (23S). Lines 14S and 23S are interconnected by virtue of the third wire, line 16 in the telephone cable, which is commonly called the sleeve lead (S) or the C-lead. A typical telephone cable has a 4-wire set in which only two of the wires are normally used.

The interface devices 11 and 21 function as a pair as follows. When the hold function is not activated, switches S1 and S2 have the same orientation (both up or both down) so that both T leads (or R leads) would be connected together via 14S, 16 and 23S (through L1 and L2). In this configuration no current flows through L1 or L2 and both lamps are OFF. To activate the hold function while a call is in progress, either switch may be thrown from either phone. In the on-hold configuration shown in FIG. 1, the tip lead (13T) of phone A connects to the ring lead (24R) of phone B. This places both lamps, L1 and L2, across the tip and ring leads thereby activating them, since the off-hook voltage (6 V) appears across the tip and ring leads with a call in progress. And, L1 and L2 draw sufficient current to cause the central office equipment to sense a continuing off-hook condition with both handsets from 10 and 20 actually being on-hook. The combined internal resistance of lamps L1 and L2 is typically several hundred ohms (e.g. 600Ω). Besides providing the necessary resistance to hold an off-hook condition, L1 and L2 also indicate to the user when a hold is in progress by being lit. When the subscriber/user returns to either of the phones, the hold condition can be removed by lifting the handset and throwing either S1 or S2 depending upon the users location. This deactivates the hold condition allowing the call to be completed. When the call is completed the user simply replaces the handset and does not have to hang up the other extension phone since it is already on-hook.

Figure 3:
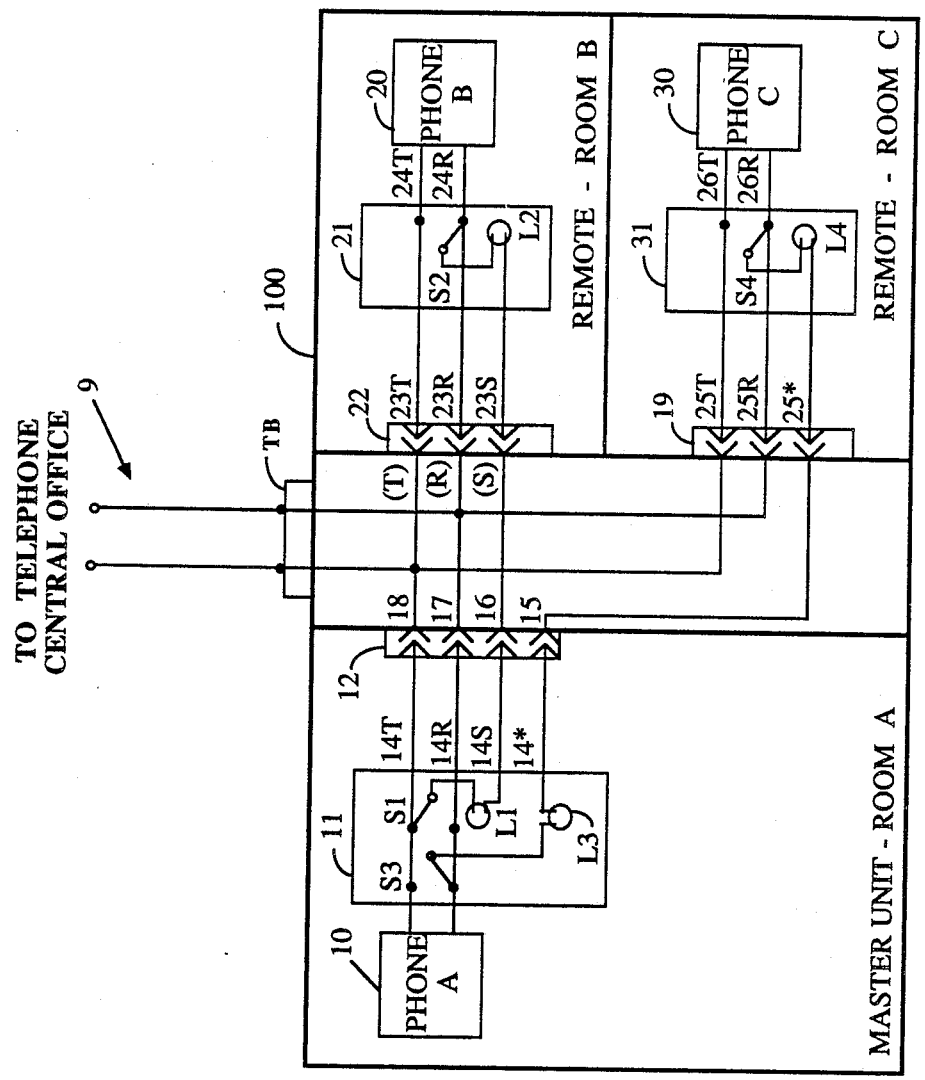
FIG. 3 is a block schematic diagram of an alternate telephone subscriber's holding circuit for a three-phone arrangement in accordance with the present invention.

FIG. 3 illustrates an alternate embodiment of the invention in which three phones are connected to a single telephone line. Unlike the previous example with three phones, one phone has to be designated as a master unit and the other two as remotes. In this configuration the interface devices 11, 21, and 31 provide a hold function between the master unit in room A and either of the two remote units in room B and C, or between either of the remotes and the master unit. However, a hold cannot be executed between two remote units.

In the embodiment illustrated in FIG. 3 a third phone 30 has been added to the two-phone example illustrated in FIG. 2. Phone B and phone C are the remotes and phone A is the master unit. Phone C plugs into a third interface device 31 which in turn plugs into wall jack 19 mounted in room C. The tip and ring leads from phone C are directly connected to the tip and ring leads of the other two phones A and B. Interface device 31 consists of a double-throw (SPDT) switch S4, a low-voltage incandescent lamp L4 and a line plug 25 and receptacle 19 making it identical to the other remote device 21 in room B. However, the third lead in room C, line 25* connects to the fourth wire in the telephone cable 15 rather than the sleeve lead 16. In room A the master interface device 11 is somewhat different from the two-phone interface device illustrated in FIG. 1. Device 11 in FIG. 3 has two switches (S1 and S3) and two lamps (L1 and L3). S1 and L1 function in combination with the remote room B device 21 via paths 14S, 16 and paths 23S, and S3 and L3 function in combination with the remote room C device via 14*, 15 and 25*. The interface devices 11 and 21 and 11 and 31 function as pairs as follows. When the hold function is not activated, switches S1 and S2 must have the same orientation (both up or both down) and S3 and S4 must have the same orientation (both up or both down). In this configuration no current flows through any of the lamps and therefore, all lamps are OFF. To activate a hold from the master unit in room A, either S1 or S3 should be switched which causes L1 or L3 (and L2 and L4) to illuminate. The choice of which switch to throw depends upon the location of the phone which will be used to finish the call. If the subscriber plans to return to room A, then either S1 or S3 can be thrown. If the subscriber plans to return to room B, however then S1 should be thrown, as illustrated in FIG. 3. And if the subscriber plans to return to room C, then S3 should be thrown. If the subscriber initiates the call from one of the remotes, either B or C, then he must return to the same phone or the master unit to remove the hold.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. Auxiliary telephone apparatus for use in combination with a pair of telephones connected to a single telephone line circuit, said apparatus for placing a temporary hold on the telephone line circuit and comprising:
    first interface means for operatively connecting one of said telephones to said telephone line circuit having tip and ring leads, said first interface means including:
        first indicator lamp means having first and second terminals, and,
        first manually actuated switching means for connecting said first terminal of said indicator lamp means to either of said tip or ring leads;

second interface means for operatively connecting the other of said telephones to said telephone line circuit, said second interface means including:
   second indicator lamp means having first and second terminals, and,
   second manually actuated switching means for connecting said first terminal of said second indicator lamp means to either of said tip or ring leads; and,
means for interconnecting said second terminals of said first and second indicator lamp means;
said first and second indicator lamp means having a combined internal series resistance sufficient to provide an off-hook condition on said telephone line circuit when both of said telephones are on-hook and when said first and second indicator lamp means are operatively connected across said tip and ring leads.

2. Apparatus as in claim 1 wherein said first manually actuated switching means further comprises a SPDT switch.

3. Apparatus as in claim 2 wherein said second manually actuated switching means further comprises a SPDT switch.

4. Apparatus as in claim 3 wherein said first indicator lamp means further comprises an incandescent lamp.

5. Apparatus as in claim 4 wherein said second indicator lamp means further comprises an incandescent lamp have an internal resistance of approximately 300Ω.

6. Apparatus as in claim 5 wherein said means for interconnecting said second terminals of said indicator lamp means further comprises a wired connection between said second terminals.

7. In combination, a telephone line circuit (9) having at least a tip (T) and ring (R) lead; a first (10), second (20), and third (30) telephone for use with the telephone line circuit; and auxiliary means for placing a hold condition on said telephone line circuit, said auxiliary means comprising:
   first interface means (11) for operatively connecting said first telephone to said telephone line circuit, said first interface means also including:
      first and second indicator lamp means (L1, L3) each having first and second terminals;
      first manually actuated switching means (S1) for connecting said first terminal of said first indicator lamp means to either of said tip or ring leads;
      second manually actuated switching means (S3) for connecting said first terminal of said second indicator lamp means to either of said tip or ring leads;
   second interface means (21) for operatively connecting said second telephone to said telephone line circuit, said second interface means also including:
      third indicator lamp means (L2) having first and second terminals, and,
      third manually actuated switching means (S2) for connecting said first terminal of said third indicator lamp means to either of said tip or ring leads; and,
   means (14S, 16, 23S) for interconnecting said second terminals of said first and third indicator lamp means;
   said first and third indicator lamp means having a combined internal series resistance sufficient to provide an off-hook condition on said telephone line circuit when all of said telephones are on-hook and when said first and third indicator lamp means are operatively connected across said tip and ring leads; and,
   third interface means (31) for operatively connecting said third telephone to said telephone line circuit, said third interface means including:
      fourth indicator lamp means (L4) having first and second terminals,
      fourth manually actuated switching means (S4) for connecting said first terminal of said fourth indicator lamp means to either of said tip or ring leads; and,
   means for interconnecting (14*, 15, 25*) said second terminals of said second and fourth indicator lamp means;
   said second and fourth indicator lamp means having a combined internal series resistance sufficient to provide an off-hook condition on said telephone line circuit when all of said telephones are on-hook and when said second and fourth indicator lamp means are operatively connected across said tip and ring leads.

8. Apparatus as in claim 7 wherein each of said manually actuated switching means further comprises a SPDT switch.

9. Apparatus as in claim 7 wherein each of said indicator lamp means further comprises an incandescent indicator lamp.

10. Apparatus as in claim 9 wherein said means for interconnecting said second terminals of said first and third indicator lamp means further comprises a wired connection.

11. Apparatus as in claim 10 wherein said means for interconnecting said second terminals of said second and fourth indicator lamp means further comprises a wired connection.

12. Apparatus as in claim 10 wherein said telephones are residential telephones physically located in separate rooms.

* * * * *